Patented Mar. 29, 1949

2,465,552

UNITED STATES PATENT OFFICE 2,465,552

SYNTHETIC RUBBERLIKE COATING AND SEALING COMPOUND

Perry M. Reedy, Jr., Burbank, Calif., assignor to Lockheed Aircraft Corporation, Burbank, Calif.

No Drawing. Application November 3, 1943, Serial No. 509,014

10 Claims. (Cl. 260—29.2)

This invention relates to sealing materials and relates more particularly to compounds for sealing containers such as tanks for containing engine fuels, oils and other volatile and penetrating fluids.

The invention finds an important application in the gasoline tanks of vehicles subject to flexure and vibration; for example, 'n airplanes where the fuel tanks are formed integral with the wings, fuselage and other structural members or parts. Heretofore the sealing of the seams, rivets, etc., of such tanks has been attempted by employing various special primers and paints, and by synthetic resins of different types. These materials have been found to be unsatisfactory for several reasons, mainly due to their lack of adequate adhesion and elasticity, especially at low temperatures, and because of their solubility in the aliphatic or aromatic fractions or water present in the motor fuels. Some of the prior sealing compounds crack at the seams or fillets and develop pinholes under the wide range of temperatures encountered in aircraft fuel tanks. Other prior compounds either become excessively hard or excessively soft due to the presence of the fuel or oil and because of the temperature conditions.

A principal object of this invention is to provide a sealing compound for fuel tanks, oil tanks and other containers that has a high degree of adherence to metals, wood, etc., and that remains flexible and resilient throughout a very wide range of temperatures and in the presence of gasoline, oil, etc. The attributes of continued adherence and maintained flexibility and resiliency well adapt the compound for the sealing of the so-called integral fuel and oil tanks of aircraft and for the sealing of other seamed enclosures subject to vibration.

Another important object of the invention is to provide a sealing compound that is not adversely affected by prolonged exposure, throughout a wide temperature range, to the presence of solvents and penetrating fluids such as aromatic and aliphatic fuel blends, water, alcohols, lacquer diluents, hydraulic fluids, and the like. This property of resisting the action of various solvents and fluids also makes the compound particularly well adapted for sealing the tanks, instruments, etc., of aircraft.

Another object of the invention is to provide a sealing compound of the character mentioned that is non-hardening and non-shrinking. Relatively thin films of the compound applied over flat surfaces, lapped seams, rivets, fillets, etc., do not crank, bridge or lift, and do not harden or become brittle. The compound is relatively free from ingredients that can cause shrinkage of the dry film either by oxidation or evaporation.

Another object of the invention is to provide a sealing compound of the character referred to that is easy to apply in practically any selected or required manner. The compound may be made up in consistencies for ready application by brushing, spraying or dipping and in heavier consistencies. for application by a trowel, knife, pressure gun, or the like to fill large gaps, fillets and corners. The improved sealing material will have a negligible tendency to sag or string out even when applied in the form of a film on vertical surfaces having lapped seams, rivets and other irregularities. The thinners employed in the compound are non-irritating and relatively non-tox'c.

Another object of the invention is to provide a sealing compound that is relatively free from objectionable odors and does not embody or necessitate the use of toxic solvents or thinners.

A further object of the invention is to provide a sealing compound of the character above referred to that is non-corrosive, that is quick drying without the application of heat and that is more resistant to heat than prior latex products.

The compound is capable of variation and the relative proportions of its components or ingredients may be modified to adapt it for different applications. For example, the compound may be found to be highly desirable as an adhesive and its ingredients may be employed in relative proportions to adapt it for such a use. In the following disclosure I will describe typical examples of the compound which find application in the sealing of tanks and other containers, it being understood that the invention is not to be construed as limited or restricted to this particular application.

The improved sealing compound of the invention may be said to comprise generally a synthetic latex, a softener for the latex, and thinners for dispersing the solid matter content.

The principal or base ingredient of the sealing compound is a synthetic polysulfide latex, or more specifically, polymer and having rubber-like qualities. I prefer to employ the synthetic latices known to the trade as Thiokol as the principal ingredient of the sealing compound. The Thiokol latices are described in United States Letters Patent, Numbers 2,216,044 and 2,195,380. This material is a liquid consisting of an aqueous dispersion of the latex solids and traces of magnesia. It has good adhesion, a high resistance to aromatic fuel blends, oil, etc., and has good low temperature flexibility. This synthetic latex, when employed in the compound of the invention, remains relatively flexible down to a temperature of −60° Fahrenheit and is capable of forming continuous adherent films on painted and bare surfaces of aluminum, aluminum alloys, etc. The solid phases of the Thiokol latices are polysulfides of the following type structure:

$$\left[\left(\overset{|}{\underset{|}{C}}\cdots\cdots\overset{|}{\underset{|}{C}}\right)-S-S\right]_n$$

The two carbons may be linked together, or may be separated by any desired intervening organic structure such as branched or straight chain hydrocarbons, ether structures or cyclic structures. The sulphur groups may vary from $S_2$ as shown, up to $S_6$ thus:

$$-\overset{\overset{S}{\|}}{\underset{\underset{S}{\|}}{S}}-\overset{\overset{S}{\|}}{\underset{\underset{S}{\|}}{S}}-$$

Variation in the relative proportion of the synthetic polymer or polymers controls the consistency of the sealing material. The sealing material may be considered as basically a dispersion of finely divided solids in a non-solvent and small changes in the solids content in the range of 50% to 75% by weight produce substantial changes in both the viscosity and thixotropy of the sealing compound. Where a "smooth" sealing compound is desired, that is, a material for covering surfaces and adapted for application by brushing, spraying, dipping, etc., the solids content is about 66% by weight. An increase of the solids content to 70% by weight results in a stiff pasty mass that is difficult to handle because it piles up on the brush or knife and is "short" in consistency. The smooth compound may be sprayed without dilution in a conventional spray gun having a large orifice nozzle. In some instances it may be desired to dilute the sealing compound with the thinner or solvent solution to the extent of 10% to 15% by volume addition, giving a solids content by weight of from 59% to 61%. When thus diluted, the sealing material has a consistency resembling that of thin house paint. If the sealing compound is thinned or diluted to reduce the solids content to the range of 50% to 55% by weight, it is runny and there is difficulty in obtaining a sealing film of the desired thickness.

An untreated synthetic polymer of the class above referred to will not dry in the form of a continuous film unless it has been subjected to a softening treatment. The softener embodied in the compound of the invention has the function of "softening" the synthetic sulphur bearing polymer to make it more tacky and to facilitate the drying of the compound in a continuous adherent film without cracking. The preferred softener has the additional function of reducing the viscosity of the dispersion to allow a substantial increase in the solids content of the sealing material. The choice of softener employed is important because the employment of a softening agent not wholly adaptable may render the compound unstable for packaging and storage or may make it excessively tacky and soft, subject to cracking or subject to surface drying or "skinning." A common characteristic of known available softeners is that they contain sulphur in the sulfide state. A simple type of softener is ammonium hydrosulfide. This softener remains stable in the dispersion for only a short time and may not be entirely effective in preventing cracking of the sealing film. The film becomes very tough as the hydrosulfide volatilizes. The ammonium hydrosulfide has a disagreeable odor and is toxic, which may limit its usefulness in the sealing compound. Also effective as softeners for the synthetic latex dispersion are various alkyl ammonium hydrosulfides such as diethyl or mono-n-butyl ammonium hydrosulfides. Another class of softeners that may be effective in the compound in producing a permanently soft film and in reducing cracking includes benzothiazyl disulfide, the tetraalkylthiuram disulfides, and mercapto benzothiazole.

I have found that the products of reaction between mono or dialkyl amines with either carbon bisulfide or hydrogen sulfide; namely mono or dialkyl ammonium salts of mono or dialkyl dithiocarbamic acid or the alkyl ammonium hydrosulfides, are highly effective as softening agents being far superior in many respects to the softeners formerly used. For example, a softening agent which I prefer to employ in the sealing compound is a sulphur-bearing water immiscible liquid whose active ingredient is di-normal-butylammonium di-normal-butyldithiocarbamate. I prefer to employ this active ingredient in a solution of an inert diluent such as ethylene glycol mono-ethyl ether or ethylene glycol mono-ethyl ether acetate. The softener is preferably used in a solution comprising 60% of the active ingredient and 40% of the inert diluent by weight. This softener operates to produce tough adherent films with dispersions of the Thiokol sulphur-bearing polymer and does not have the undesirable characteristics and properties of certain other softeners. It is more stable than ammonium hydrosulfide, is much less offensive in odor and its use in the compound results in less cracking of the drying film. When a suitable proportion of the preferred softener is employed, the sealing compound forms a tough adherent film resistant to water, aromatic fuels and oil throughout the temperature range of from over 180° Fahrenheit to below −60° Fahrenheit. The sealing film retains its adherence on bare and painted surfaces at both sub-zero and elevated temperatures, and maintains a high resistance to flow. When the preferred softener is used, the sealing film is more resistant to high temperatures than the prior sealing materials or films made with other softening agents. The reaction products of dibutyl or diamyl amine with carbon bisulfide have been found to have substantially the same softening action as the preferred softener. While in most instances it is preferred to employ the mono or dialkyl amines, other suitable softeners may be formed from the reaction of ammonia, cyclic, heterocyclic, or aryl derivatives of ammonia, or heterocyclic compounds wherein the nitrogen is in the ring. Thus the softener may be one or more of the ammonium dithiocarbamates of the type formula $$\left[\begin{array}{c}R_1\\ \diagdown\\ \diagup\\ R_2\end{array}N-\overset{\overset{S}{\|}}{C}-S\right]^{-}\left[\begin{array}{c}R_3\ H\\ \diagdown\diagup\\ N\\ \diagup\diagdown\\ R_4\ H\end{array}\right]^{+}$$

where $R_1$, $R_2$, $R_3$, and $R_4$ may be hydrogen, alkyl, aryl, or cyclic groups and may or may not be the same.

The relative proportions of the softener may be varied somewhat as the intended conditions of use of the sealing compound may indicate. Relatively minor variations in the concentration of the softener produce substantial changes in the properties of the compound. However, the softener may be used in proportions of from 1.5% to 3.5% by weight with good results. If the proportion of the softener is too low, incipient cracking will occur causing abrupt discontinuities in the film. If the proportion of the softener is excessively increased the sealing film has a markedly lessened tendency to crack even in the fillets, but is excessively soft, particularly in the presence of aromatic fuels at high temperatures, and the material is quite plastic with a low degree of elasticity. When the material is to be used as a caulking and filleting material, the softener may be used in the proportion of from 3% to 3.5% by weight to impart the desired plasticity to the material.

The solvents or thinners facilitate handling and packaging of the sealing compound and their use results in a smoother mixture having good brushing characteristics and rapid drying properties. In accordance with the invention, water initially present in the synthetic latex is replaced to a large degree, or so far as practical by the thinner or solvent mixture. The thinners employed are such that they insure solubility of the softener at all times during volatilization of the thinners and during drying of the film. The preferred thinners are isopropyl alcohol $(CH_3)_2$—CHOH, normal propyl alcohol $CH_3$—$CH_2$—$CH_2OH$ and water.

The isopropyl alcohol promotes rapid drying of the sealing film and insures miscibility of the softener in the residual water present in the synthetic latex. The normal propyl alcohol has a relatively low evaporation rate and remains in the liquid phase to the extent that the water concentration at all times remains sufficiently low to prevent separation of the softener. If the softener is allowed to separate in the liquid phase, the sealing compound has poor adhesion and acts as though a film of oil were present under the sealing material. The normal propyl alcohol remains in the liquid phase to a sufficient extent during drying of the sealing film to prevent such separation of the softener. The normal propyl alcohol also serves to assist in softening the synthetic latex, apparently having a slight swelling action upon the polymer. The preferred alcohols assure the full solubility of the softener throughout the period of evaporation of the solvent mixture.

The preferred solvents isopropyl alcohol and normal propyl alcohol may be substituted for, in whole or in part, by other more or less water miscible aliphatic alcohols such as methyl, ethyl, normal-butyl, secondary-butyl, tertiary-butyl and iso-butyl. In the event of such substitution it should be borne in mind that a single phase liquid must be maintained at all times during the drying stage, and that a substitution of solvents may produce a change in the drying rate. The solvent alcohols may be replaced wholly or in part by other more or less water soluble organic liquids such as methyl cellosolve, the lower ketones and the lower esters. Further, the synthetic latex may be dispersed in water immiscible solvents by the phase inversion process, in which case the above described preferred softener is also suitable as the softening agent.

The water content of the sealing material is preferably reduced to a practical minimum as by solvent washing of the synthetic latex prior to compounding of the sealing material. It is desirable that the water content should be held to a practical minimum because the preferred softener, while soluble in alcohol, is insoluble in water.

The maximum allowable concentration of water depends to some extent upon the particular solvent system employed, but in any case, the water concentration should be kept low enough to prevent the softener from separating out as a two-phase system throughout the drying period of the sealing film. The concentrations or relative proportions of the solvents or thinners may be varied within fairly wide limits consistent with the basic requirements.

A filler may be embodied in the sealing compound, especially when it is to be employed as a caulking or filleting material. The filler serves to increase the body of the compound and decreases its tendency to crack in the seams and fillets. It has been found desirable to employ a short fiber asbestos as the filler, it being apparent that other suitable fillers may be used.

The following examples of the compounds provided by the invention are preferred, but are not to be considered as limiting the invention to the particular ingredients or concentrations set forth.

EXAMPLE A

*Brushing and spraying compound*

|  | Per cent |
|---|---|
| Synthetic latex (Thiokol solids) | 65.6 |
| Water | 8.5 |
| Isopropyl alcohol | 19.0 |
| N-propyl alcohol | 5.6 |
| Softener (di-n-butylammonium di-n-butyl-dithiocarbamate) (60% solution) | 1.2 |

EXAMPLE B

*Caulking and filleting compound*

|  | Per cent |
|---|---|
| Synthetic latex (Thiokol solids) | 63.3 |
| Water | 8.2 |
| Isopropyl alcohol | 18.3 |
| N-propyl alcohol | 5.4 |
| Softener (di-n-butylammonium di-n-butyl-dithiocarbamate) | 1.8 |
| Short fiber asbestos | 3.2 |

In preparing the sealing compound, the aqueous dispersion of the synthetic latex is caked on a filter until it cracks. When the latex cracks on the filter it contains about 75% solids by weight. Isopropyl alcohol is then added to and mixed with the cake in the proportion of about 50 milliliters for each 100 grams of the cake. The cake and the isopropyl alcohol are thoroughly mixed to produce a uniform dispersion. This dispersion is caked on the filter until it cracks, again producing a cake of about 75% by weight of solids. For each 100 grams of the cake, 8 milliliters of isopropyl alcohol and 8 milliliters of normal isopropyl alcohol are added. Where a smooth product for brushing and spraying is desired, the softener in the amount of 1.5 milliliters for each 100 grams of the cake is added and the several ingredients are thoroughly mixed. If a caulking and filleting material is being produced, a filler such as short fiber asbestos in the amount of about 3.75 grams is added for each 100 grams of the cake, following the mixing in of the alcohols. Subsequent to the addition of the filler, the softening agent in the amount of 2.25 milliliters for each 100 grams of the cake may be added and the several ingredients thoroughly mixed.

It is to be understood that the invention is not to be taken as limited to the express procedure or examples set forth above, these details being given only by way of illustration. I do not regard such specific details as essential to the invention except insofar as they are expressed by way of limitation in the appended claims, in which it is my intention to claim the invention as broadly as permissible in view of the prior art.

I claim:

1. A composition of the character described comprising an aqueous dispersion of a polyalkylene polysulfide which is a polymer of the unit

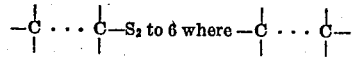

represents two carbon atoms joined to and separated by intervening structure, the solids content of the dispersion constituting from 50% to 75% by weight of the composition, from 1.5% to 3.5% by weight of an alkyl ammonium alkyl dithiocarbamate to soften the polysulfide so that the same will dry in the form of a continuous adherent non-cracking coating upon being applied as a sealant, and a sufficient quantity of a saturated aliphatic monohydric alcohol containing not more than four carbon atoms to maintain said dithiocarbamate in the dissolved state and to increase the fluidity of the dispersion for such application as a sealant.

2. A composition of the character described comprising an aqueous dispersion of a polyalkylene polysulfide which is the polymer of the unit

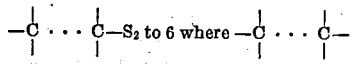

represents two carbon atoms joined to and separated by intervening structure, the solids content of the dispersion constituting from 50% to 75% by weight of the composition, from 1.5% to 3.5% by weight of an alkyl ammonium alkyl dithiocarbamate, and a sufficient quantity of a saturated aliphatic monohydric alcohol containing not more than four carbon atoms to maintain said dithiocarbamate in the dissolved state and to further disperse said polysulfide polymer.

3. A composition of the character described comprising an aqueous dispersion of a polyalkylene polysulfide which is the polymer of the unit

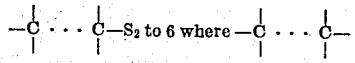

represents two carbon atoms joined to and separated by intervening structure, the solids content of the dispersion constituting from 50% to 75% by weight of the composition, from 1.5% to 3.5% by weight of a dialkyl ammonium salt of dithiocarbamic acid for softening said polysulfide polymer, and a sufficient quantity of a saturated aliphatic monohydric alcohol containing not more than four carbon atoms to maintain said dialkyl ammonium salt in the dissolved state and to further disperse said polysulfide.

4. A composition of the character described comprising an aqueous dispersion of a polyalkylene polysulfide which is the polymer of the unit

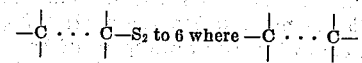

represents two carbon atoms joined to and separated by intervening structure, the solids content of the dispersion constituting from 50% to 75% by weight of the composition, from 1.5% to 3.5% by weight of a dibutyl ammonium salt of dibutyldithiocarbamic acid for softening said polysulfide polymer, and a sufficient quantity of a saturated aliphatic monohydric alcohol containing not more than four carbon atoms to maintain said dibutyl ammonium salt in the dissolved state and to further disperse said polysulfide polymer.

5. A composition of the character described comprising an aqueous dispersion of a polyalkylene polysulfide which is the polymer of the unit

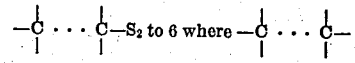

represents two carbon atoms joined to and separated by intervening structure, the solids content of the dispersion constituting from 50% to 75% by weight of the composition, from 1.5% to 3.5% by weight of a softener containing 60% by weight of an alkyl ammonium alkyl dithiocarbamate and 40% by weight of an inert diluent selected from the group consisting of ethylene glycol mono-ethyl ether and ethylene glycol mono-ethyl ether acetate, and a sufficient quantity of a saturated aliphatic monohydric alcohol containing not more than four carbon atoms to maintain the dithiocarbamate in a dissolved state and to further disperse said polymer.

6. A composition of the character described comprising an aqueous dispersion of a polyalkylene polysulfide which is the polymer of the unit

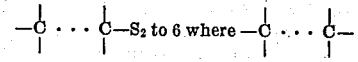

represents two carbon atoms joined to and separated by intervening structure, the solids content of the dispersion constituting from 50% to 75% by weight of the composition, from 1.5% to 3.5% by weight of a diamyl ammonium salt of diamyldithiocarbamic acid for softening said polymer, and a sufficient quantity of a saturated aliphatic monohydric alcohol containing not more than four carbon atoms to maintain said diamyl ammonium salt in a dissolved state and to further disperse said polymer.

7. A composition of the character described comprising an aqueous dispersion of a polyalkylene polysulfide which is the polymer of the unit

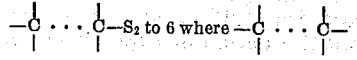

represents two carbon atoms joined to and separated by intervening structure, the solids content of the dispersion constituting from 50% to 75% by weight of the composition, from 1.5% to 3.5% by weight of an alkyl ammonium alkyldithiocarbamate, and a sufficient quantity of isopropyl alcohol to maintain said dithiocarbamate in a dissolved state and to further disperse said polymer.

8. A composition of the character described comprising an aqueous dispersion of a polyalkylene polysulfide which is the polymer of the unit

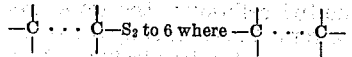

represents two carbon atoms joined to and separated by intervening structure, the solids content of the dispersion constituting from 50% to 75% by weight of the composition, from 1.5% to 3.5% by weight of an alkyl ammonium alkyldithiocarbamate, and a sufficient quantity of normal propyl alcohol to maintain said dithiocarbamate in a dissolved condition and to further disperse said polymer.

9. A composition of the character described comprising an aqueous dispersion of a polyalkylene polysulfide which is a polymer of the unit

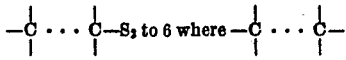

represents two carbon atoms joined to and separated by intervening structure, the solids content of the dispersion constituting 65% by weight of the composition, 8.50% by weight of water, 1.2% by weight of a di-n-butylammonium di-n-butyldithiocarbamate, and 24.6% by weight of a saturated aliphatic monohydric alcohol containing not more than four carbon atoms.

10. A composition of the character described comprising on an approximate weight basis 63% of a polyalkylene polysulfide which is a polymer of the unit

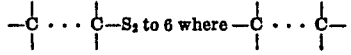

represents two carbon atoms joined to and separated by intervening structure, 8% water, 24% of a saturated aliphatic monohydric alcohol containing not more than four carbon atoms, 1.8% di-n-butylammonium di-n-butyldithiocarbamate and 3% of a fibrous filler.

PERRY M. REEDY, Jr.

REFERENCES CITED

The following references are of record in the file of this patent:

UNITED STATES PATENTS

| Number | Name | Date |
|---|---|---|
| 2,140,063 | Talalay | Dec. 13, 1938 |
| 2,186,714 | Youker | Jan. 9, 1940 |
| 2,206,642 | Patrick | Jan. 9, 1940 |
| 2,261,349 | Kelly | Nov. 4, 1941 |

FOREIGN PATENTS

| Number | Country | Date |
|---|---|---|
| 422,826 | Great Britain | Jan. 18, 1935 |
| 499,747 | Great Britain | Jan. 24, 1939 |